(12) United States Patent
Wang

(10) Patent No.: US 8,520,910 B2
(45) Date of Patent: Aug. 27, 2013

(54) METHOD FOR PREDICTING CONSTELLATIONS BY USING FINGERPRINT TYPES AND BLOOD TYPES, AND SYSTEM THEREOF

(75) Inventor: Jing-Wein Wang, Kaohsiung (TW)

(73) Assignee: National Kaohsiung University of Applied Sciences, Kaohsiung (TW)

( * ) Notice: Subject to any disclaimer, the term of this patent is extended or adjusted under 35 U.S.C. 154(b) by 1311 days.

(21) Appl. No.: 12/276,624

(22) Filed: Nov. 24, 2008

(65) Prior Publication Data

US 2010/0008532 A1    Jan. 14, 2010

(30) Foreign Application Priority Data

Jul. 10, 2008   (TW) .............................. 97138502 A
Jul. 11, 2008   (TW) .............................. 97143054 A

(51) Int. Cl.
*G06K 9/00*       (2006.01)

(52) U.S. Cl.
USPC ........................................ 382/124; 273/161

(58) Field of Classification Search
None
See application file for complete search history.

(56) References Cited

U.S. PATENT DOCUMENTS

| D250,850 S | 1/1979 | Osborne, Jr. |
| 6,523,039 B1 | 2/2003 | Chen |
| 2002/0141644 A1 | 10/2002 | Lin |

*Primary Examiner* — Tsung-Yin Tsai
(74) *Attorney, Agent, or Firm* — Alan Kamrath; Kamrath IP Lawfirm, P.A.

(57) ABSTRACT

A method for predicting constellations includes the steps of: providing probability data of correlations between constellations and combined fingerprint types and blood types, and constellation fortune-telling data; detecting and classifying a fingerprint image; inputting a personal blood type; calculating probabilities of correlations between the constellations and the combined fingerprint types and blood types; and correspondingly outputting the constellation fortune-telling data according to the calculated probability. A constellation-predicting system of a preferred embodiment includes a fingerprint-image-detecting device, a blood-type-inputting unit, a calculating unit, a memory unit and a terminal unit which are connected to form the system.

9 Claims, 4 Drawing Sheets

METHOD FOR PREDICTING CONSTELLATIONS BY USING FINGERPRINT TYPES AND BLOOD TYPES, AND SYSTEM THEREOF

BACKGROUND OF THE INVENTION

1. Field of the Invention

The present invention relates to a method for predicting constellations or personality features by using fingerprint types and blood types, and a system thereof. More particularly, the present invention relates to the method and the system for predicting constellations or personality features by using the fingerprint types of a right loop, a left loop, a tented arch, a plain arch (i.e. arch), a whorl, an eddy and a twin loop (i.e. S-type).

2. Description of the Related Art

Currently, a number of constellation fortune-telling methods and systems or constellation-predicting methods and systems are widely used and are also described in some Taiwanese patents. For example, Taiwanese patent pub. No. 381755, entitled "Constellation Fortune-telling Machine," discloses a mechanism for indicating contents of fortune telling. The above-mentioned Taiwanese patent is incorporated herein by reference for purposes including, but not limited to, indicating the background of the present invention and illustrating the state of the art.

Additionally, the constellation fortune-telling methods and systems or constellation-predicting methods and systems are also described in some U.S. patents. For example, the related U.S. patents include: U.S. Pat. No. Des. 250,850, entitled "Amusement Fortune-Telling Machine or the Like;" U.S. Pat. No. 6,523,309, entitled "Fortune-Telling Oriented Network Information Supply System;" and U.S. Patent Pub. No. 20020141644, entitled "System for Conducting Fortune Telling and Character Analysis over Internet Based on Names of Any Language." Each of the above-mentioned U.S. patents is incorporated herein by reference for purposes including, but not limited to, indicating the background of the present invention and illustrating the state of the art.

However, the techniques described in the above-mentioned patents fail to disclose any fortune-telling method or system utilizing personal fingerprints or blood types to predict constellation. Although various conventional techniques applied in the fortune-telling methods and systems are well known in the art, there is a need for providing a fortune-telling method or system utilizing biometric features for the purpose of entertainment or an aptitude test.

As is described in greater detail below, the present invention provides a method and a system combining fingerprint types and blood types for predicting constellations or personality features in such a way as to mitigate and overcome the above problem.

SUMMARY OF THE INVENTION

The primary objective of this invention is to provide a method for predicting constellations or personality features by using fingerprint types and blood types. The combined personal fingerprint type and blood type have a probability of constellation so that the method of the present invention for predicting personal constellation is accomplished.

Another objective of this invention is to provide a system for predicting constellations by using fingerprint types and blood types. A calculating unit is used to generate a probability of constellation or personality features by inputting at least one personal fingerprint and a blood type. Accordingly, the system of the present invention is successful in generating a calculation result of constellation or personality feature.

The method for predicting constellations in accordance with an aspect of the present invention includes the steps of:

providing a plurality of probability data of correlations between constellations and combined fingerprint types and blood types, and providing a plurality of constellation fortune-telling data or personality feature data;

detecting at least one fingerprint image and classifying the fingerprint types thereof;

inputting a personal blood type;

calculating probabilities of correlations between the constellations and the combined fingerprint types and blood types, and correspondingly outputting at least one constellation fortune-telling data or personality feature data according to the calculated probability.

In a separate aspect of the present invention, the fingerprint image is selected from an image of a left thumb fingerprint or a right thumb fingerprint.

In a further separate aspect of the present invention, the fingerprint types include a right loop, a left loop, a tented arch, a plain arch (i.e. arch), a whorl, an eddy and a twin loop (i.e. S-type).

In a further separate aspect of the present invention, the probability data is selected from the correlations between constellations and combined left and right thumb fingerprint types and blood types.

In a yet further separate aspect of the present invention, a classification method for fingerprint types is utilized and includes the steps of:

preprocessing the fingerprint image;

retrieving singular points of cores and deltas from the processed fingerprint image, and calculating symmetry, circles and quadrants of the processed fingerprint image to obtain orientation flows thereof;

classifying the fingerprint image according to the number of the singular points and the orientation flows to identify the fingerprint types of a right loop, a left loop, a tented arch, an arch, a whorl, an eddy and a twin loop.

The constellation-predicting system in accordance with an aspect of the present invention includes a fingerprint-image-detecting device, a blood-type-inputting unit and a calculating unit. The fingerprint-detecting device is used to detect at least one fingerprint image, and the blood-type-inputting unit is used to input a personal blood type to the system. The calculating unit is used to identify the number of singular points and to trace the orientation flow of the fingerprint image, and to calculate at least one probability of the correlations between constellations and combined fingerprint types and blood types.

In a separate aspect of the present invention, the system further includes a memory unit to store constellation fortune-telling data, personality feature data and probability data of correlations between constellations and combined fingerprint types and blood types.

In a further separate aspect of the present invention, the system further includes a terminal unit to correspondingly output at least one of the constellation fortune-telling data according to the calculated probability.

In a yet further separate aspect of the present invention, the terminal unit is selected from a display or a printer.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a method for predicting constellations by using fingerprint types and blood types and a system thereof in accordance with the present invention can be implemented by computer-executable process steps on a variety of computing equipment, including personal computers, laptop computers, or the like. A constellation-predicting system of the present invention may be in the form of computer game systems, fortune-telling machines or computer software which are given by way of illustration only and are not limitative of the present invention.

Through the specification, the term "constellation" or "constellations" mean that western constellations of a personalized horoscope determined by birthdate are used for describing personality features, characteristics or the like. The term "blood type" or "blood types" mean human blood types.

Figure 1:
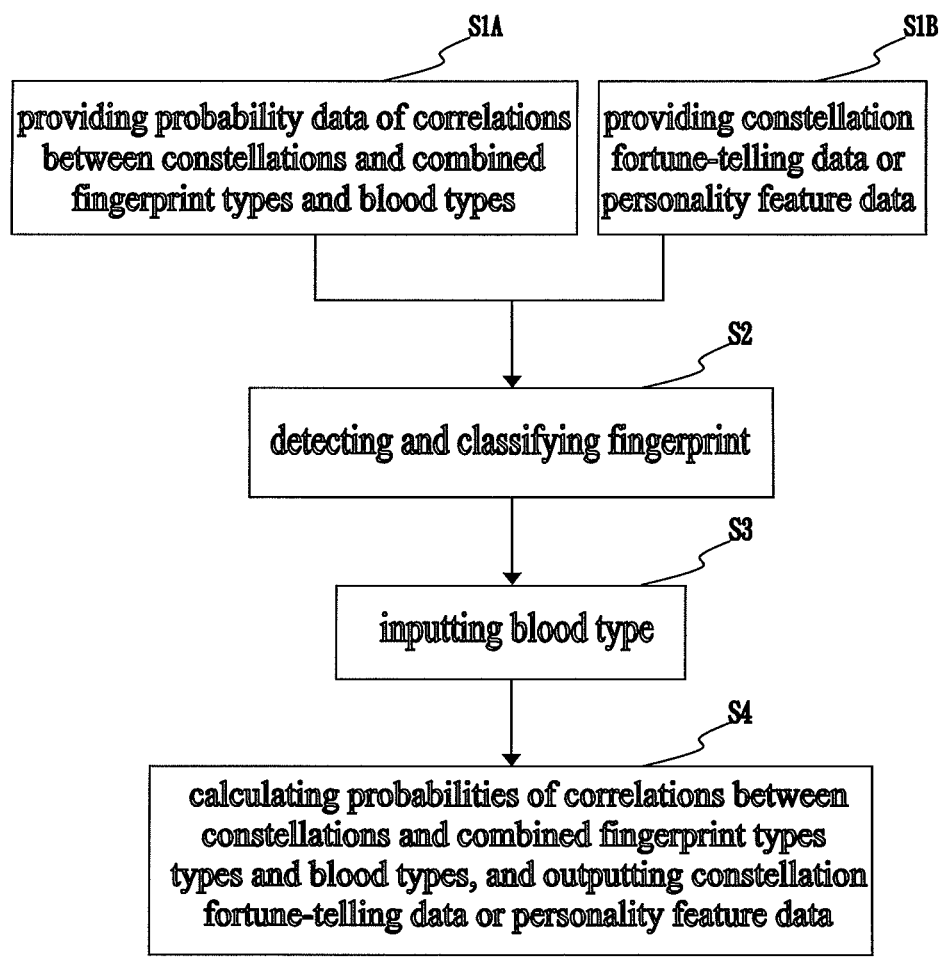
FIG. 1 is a flow chart of a method for predicting constellations by using fingerprint types and blood types in accordance with a preferred embodiment of the present invention.

Referring now to FIG. 1, the method for predicting constellations by using fingerprint types and blood types in accordance with a preferred embodiment of the present invention is shown as an example, and is not limitative of the present invention. The method for predicting constellation by using fingerprint types and blood types in accordance with the present invention has five steps S1A, S1B, S2, S3 and S4 which can be modified and changed without departing from the scope of the invention.

With continued reference to FIG. 1, the method of the preferred embodiment of the present invention is firstly operated to execute the step S1A of: providing a plurality of probability data of correlations between constellations and combined fingerprint types and blood types; and the step S1B of: providing a plurality of constellation fortune-telling data or personality feature data. For example, the constellation fortune-telling data or personality feature data are preset to have relationships with the different probability data provided in step S1A.

With continued reference to FIG. 1, the method of the preferred embodiment of the present invention is operated to further execute the step S2 of: detecting a personal fingerprint image of a single finger or a number of personal fingerprint images of different fingers, and thus analyzing the detected fingerprint image(s). Preferably, the detected fingerprint images are classified into fingerprint types of a right loop, a left loop, a tented arch, a plain arch (i.e. arch), a whorl, an eddy and a twin loop (i.e. S-type), which are not limitative of the present invention.

In step S2, a classification method for fingerprint types is utilized in accordance with the present invention, and includes the steps of: preprocessing the fingerprint image to reduce the amount of the fingerprint image data; retrieving singular points of cores and deltas from the processed fingerprint image, and further calculating symmetry, circles and quadrants of the processed fingerprint image to obtain orientation flows thereof; classifying the fingerprint image according to the number of the singular points and the orientation flows to identify the fingerprint types of a right loop, a left loop, a tented arch, a arch, a whorl, an eddy and a twin loop. In an embodiment, such a classification method for fingerprints is described in Taiwanese patent application Nos. 097138502 and 097143054, each of which is hereby incorporated by reference in its entirety.

In a preferred embodiment, the fingerprint image detected in step S2 is selected from an image of a left thumb fingerprint or a right thumb fingerprint. In another preferred embodiment, the fingerprint images detected in step S2 may be selected from a set of two images of left and right thumb fingerprints.

With continued reference to FIG. 1, the method of the preferred embodiment of the present invention is operated to further execute the step S3 of: inputting a personal blood type which is used to combine with the fingerprint types classified in step S2. In a preferred embodiment, there are preset blood types, including O type, A type, B type and AB type.

With continued reference to FIG. 1, the method of the preferred embodiment of the present invention is operated to further execute the step S4 of: calculating probabilities of correlations between the constellations and the combined fingerprint types and blood types. In a preferred embodiment, the probabilities of correlations between the constellations and the combined fingerprint types of right and left thumbs and blood types are calculated. After being calculated, at least one constellation fortune-telling data or personality feature data according to the calculated probability is generated and output.

Figure 2:
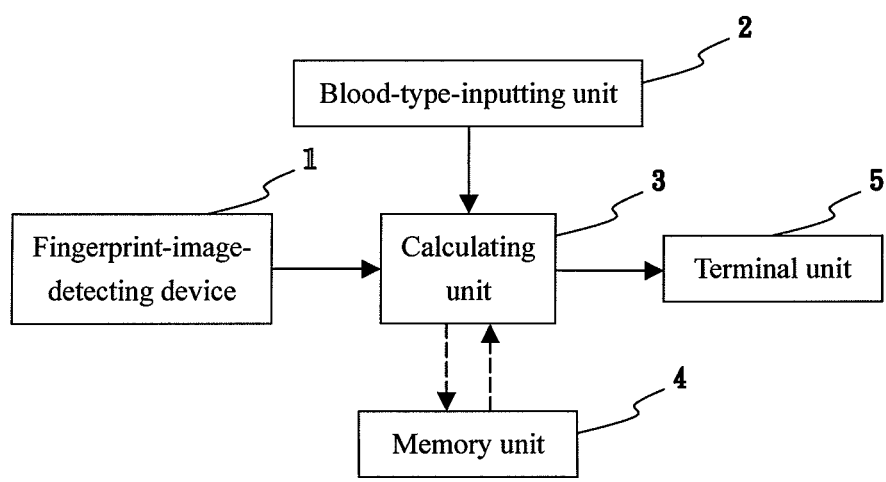
FIG. 2 is a block diagram of a system for predicting constellations by using fingerprint types and blood types in accordance with a preferred embodiment of the present invention.

Turning now to FIG. 2, a system for predicting constellation by using fingerprint types and blood types in accordance with a preferred embodiment of the present invention is shown. The constellation-predicting system of the preferred embodiment of the present invention includes a fingerprint-image-detecting device 1, a blood-type-inputting unit 2, a calculating unit 3, a memory unit 4 and a terminal unit 5 which are connected and assembled to form a computer game device or a fortune-telling machine that is not limitative of the present invention.

Referring again to FIG. 2, the fingerprint-detecting device 1 is used to detect a personal fingerprint image of a single finger or a number of personal fingerprint images of different fingers, and analyzing the detected fingerprint images to classify into fingerprint types of a right loop, a left loop, a tented arch, a plain arch (i.e. arch), a whorl, an eddy and a twin loop (i.e. S-type).

With continued reference to FIG. 2, the blood-type-inputting unit 2 is used to input a personal blood type to the system. In a preferred embodiment, the blood-type-inputting unit 2 is formed from a plurality of push buttons or a series of selection blocks of a user interface generated from computer software.

For example, there are provided four push buttons or selection blocks of each blood type of O, A, B and AB.

With continued reference to FIG. 2, the calculating unit 3 is used to identify the number of singular points and to trace the orientation flow of the fingerprint image, and to calculate at least one probability of the correlation between constellations and combined fingerprint types and blood types. Once calculated, the constellation-predicting system of the present invention can output at least one constellation fortune-telling data according to the calculated probability.

Still referring to FIG. 2, the memory unit 4 is used to the store the probability data, and the constellation fortune-telling data containing personality features or characteristics, for example. In operation, the memory unit 4 can provide the constellation-predicting system with the constellation fortune-telling data displayed on the terminal unit 5. In a preferred embodiment, the terminal unit 5 is selected from a display or a printer which can be used to display the constellation fortune-telling data or personality feature data according to the calculated probability.

Figure 3:
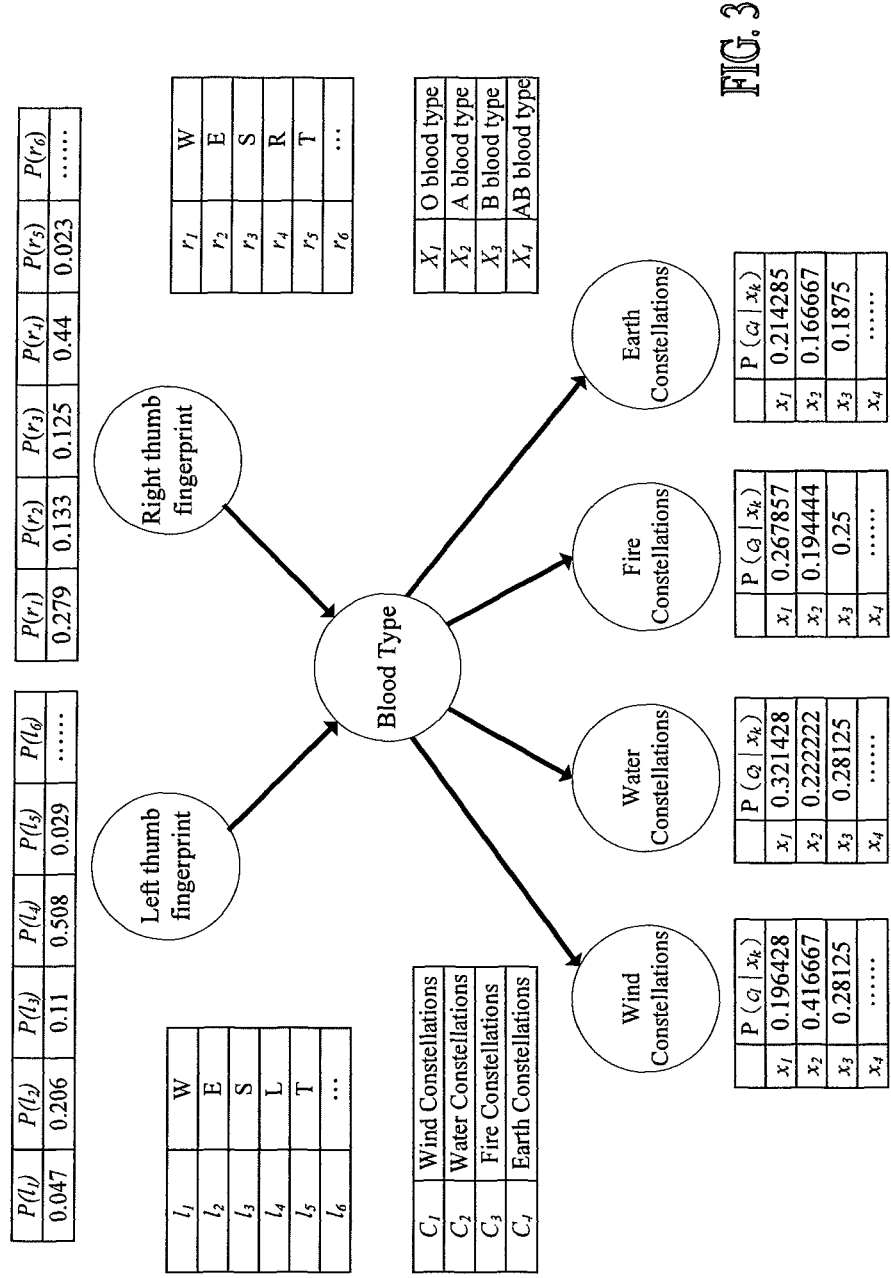
FIG. 3 is a block schematic diagram of the system for predicting constellations by using fingerprint types of left and right thumbs and blood types in accordance with a preferred embodiment of the present invention.

Turning now to FIG. 3, the system for predicting constellation by using fingerprint types of left and right thumbs and blood types in accordance with a preferred embodiment of the present invention is shown. In FIG. 3, information of constellations and blood types, and some examples of probabilities of their correlations are given. In this preferred embodiment, images of left and right thumbs are detected and combined in the constellation-predicting system. Subsequently, a personal blood type is given to the constellation-predicting system, as best shown in the center portion in FIG. 3. Consequently, a prediction pertaining to one of a wind constellation, a water constellation, an earth constellation and a fire constellation can be generated in the constellation-predicting system according to the calculated probability.

Figure 4:
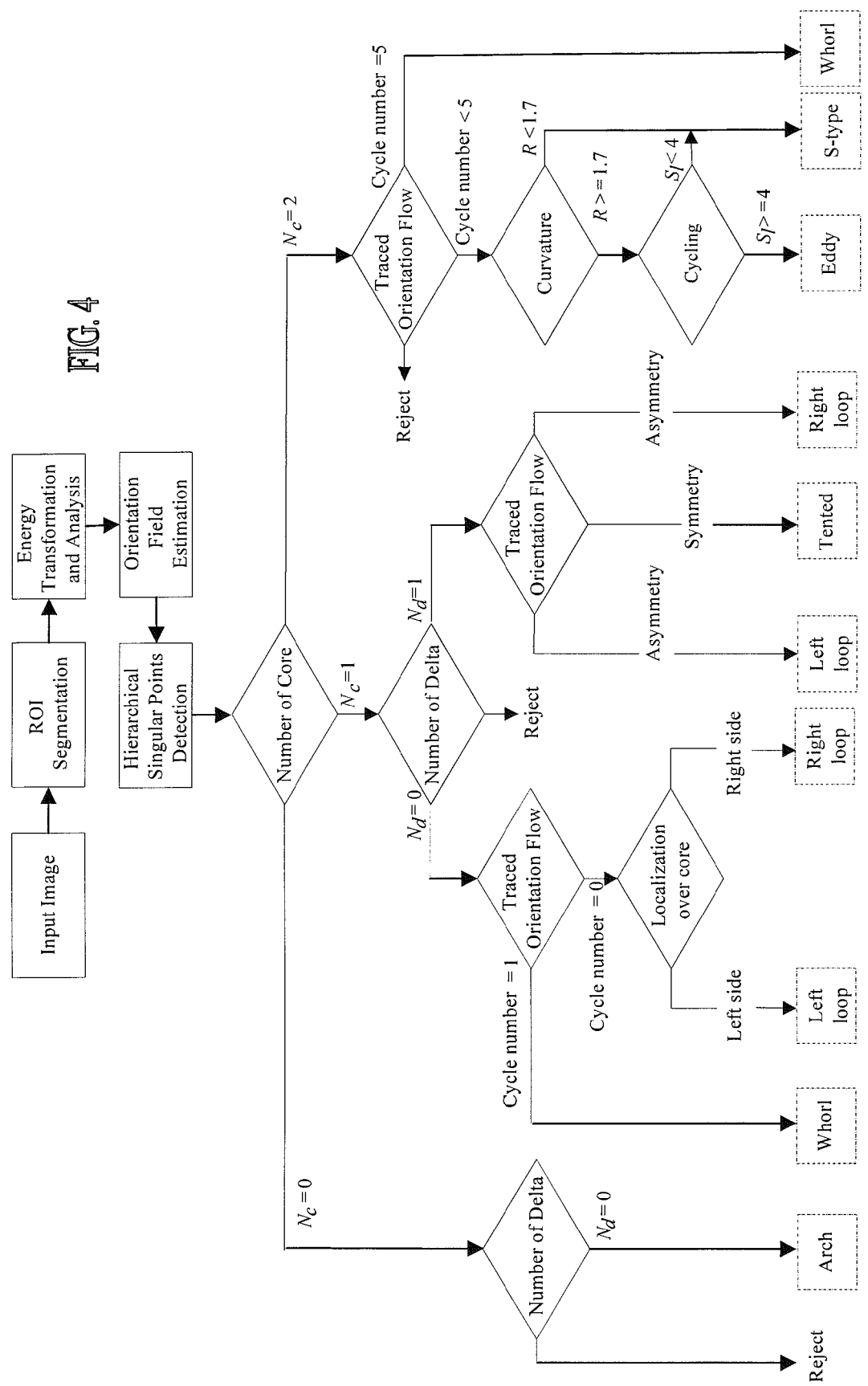
FIG. 4 is a block diagram of a fingerprint classification method applied in the method for predicting constellations by using fingerprint types and blood types in accordance with a preferred embodiment of the present invention.

Turning now to FIG. 4, a fingerprint classification method applied in the method for predicting constellation by using fingerprint types and blood types in accordance with a preferred embodiment of the present invention is shown. The classification method includes a ROI (Region of Interest) segmentation step, an energy transformation and analysis step, an orientation field estimation step and a singular point detection step. The ROI segmentation step and the energy transformation and analysis step are data-preprocessing steps in order to reduce the amount of data processing in the system.

Still referring to FIG. 4, the fingerprint classification method utilizing hierarchical singular point detection and traced orientation flow is executed to classify the fingerprint into seven classes or categories: a right loop (identified as R), a left loop (identified as L), a tented arch (identified as T), a plain arch or arch (identified as A), a whorl (identified as W), an eddy (identified as E) and a twin loop or S-type (identified as S).

Referring again to FIG. 4, classification rules (Rules 1 through 4) of the fingerprint classification method utilizes the number of cores, deltas and circles, a degree of curvature and asymmetry, and the number of cycling quadrants in classifying the fingerprints into seven categories.

As best shown in the right portion of FIG. 3, for example, the blood types include O, A, B and AB, and the statistic probabilities of blood types are identified as "$X_1$", "$X_2$", "$X_3$" and "$X_4$" which can be input by users and are statistically calculated. The blood types, fingerprints and dates of birth (e.g. constellation) for individuals are inputted to the system shown in FIG. 3.

As best shown in the left top portion of FIG. 3, for example, the statistic probabilities of the fingerprint types of left thumbs are provided with $P(l_1)=0.047$ of whorl (identified as W), $P(l_2)=0.206$ of eddy (identified as E), $P(l_3)=0.11$ of S-type (identified as S), $P(l_4)=0.508$ of left loop (identified as L), $P(l_5)=0.029$ of tented arch (identified as T) and $P(l_6)$ =balance which are electronically-scanned and classified by the method shown in FIG. 4.

As best shown in the right top portion of FIG. 3, for example, the probabilities of the fingerprint types of right thumbs are provided with $P(r_1)=0.279$ of whorl (identified as W), $P(r_2)=0.133$ of eddy (identified as E), $P(r_3)=0.125$ of S-type (identified as S), $P(r_4)=0.44$ of right loop (identified as R), $P(r_5)=0.023$ of tented arch (identified as T) and $P(r_6)$ =balance which are electronically-scanned and classified by the method shown in FIG. 4.

As best shown in the bottom portion of FIG. 3, for example, the constellations include wind, water, fire and earth and are identified as "$C_1$", "$C_2$", "$C_3$" and "$C_4$", respectively. The probabilities of the constellations combined with blood types are identified as "$P(C_1/X_k)$", "$P(C_2/X_k)$", "$P(C_3/X_k)$" and "$P(C_4/X_k)$", respectively. $P(C_1/X_k)$, $P(C_2/X_k)$, $P(C_3/X_k)$ and $P(C_4/X_k)$ are calculated from the probabilities of constellations and blood types. Accordingly, $P(C_1/X_k)$, $P(C_2/X_k)$, $P(C_3/X_k)$ and $P(C_4/X_k)$ of the present invention are scientifically applied to calculate and predict the constellations or personality features.

Still referring to the bottom portion of FIG. 3, for example, the calculated probabilities of wind constellation with O, A, B and AB blood types are 0.196428, 0.416667, 0.28125 and the balance, as shown in the first bottom list of FIG. 3. The calculated probabilities of water constellation with O, A, B and AB blood types are 0.321428, 0.222222, 0.28125 and the balance, as shown in the second bottom list of FIG. 3. The calculated probabilities of fire constellation with O, A, B and AB blood types are 0.267857, 0.194444, 0.25 and the balance, as shown in the third bottom list of FIG. 3. The calculated probabilities of earth constellation with O, A, B and AB blood types are 0.214285, 0.166667, 0.1875 and the balance, as shown in the fourth bottom list of FIG. 3.

Referring back to FIG. 4, for example, the classification rules of the fingerprint classification method for input fingerprint images applied in the present invention are:

Rule 1: an arch type fingerprint is identified if the number of cores and deltas are 0 ($N_c=0$ and $N_d=0$), as shown in the most left portion of FIG. 4;

Rule 2: a whorl type fingerprint is identified if the number of cores is 1, the number of deltas is 0 ($N_c=1$, $N_d=0$) and the number of circles is 1; a right or left loop fingerprint is identified if the number of cores is 1, the number of deltas is 0 ($N_c=1$, $N_d=0$) and the number of circles is 0, as shown in the left portion of FIG. 4;

Rule 3: a tented arch fingerprint is identified if the number of cores is 1, the number of deltas is 1 ($N_c=1$, $N_d=1$) and the fingerprint is symmetric; a right or left loop fingerprint is identified if the number of cores is 1, the number of deltas is 1 ($N_c=1$, $N_d=1$) and the fingerprint tilts to the right or left, as shown in the right portion of FIG. 4;

Rule 4: a whorl type fingerprint is identified if the number of cores is 2 ($N_c=2$) and the number of circles is equal to or greater than 5; a S type fingerprint is identified if the number of cores is 2 ($N_c=2$), the number of circles is less than five and the curvature $R_\theta$ is equal to or greater than 1.7 or the number of cycling quadrants $S_1$ is less than 4; an eddy type fingerprint is identified if the number of cores is 2 ($N_c=2$), the number of circles is less than five, the curvature $R_\theta$ is equal to or greater than 1.7 and the number of cycling quadrants $S_1$ is equal to or greater than 4, as shown in the most right portion of FIG. 4.

Accordingly, the present invention provides the method and system combining the probabilities of fingerprint types and blood types of individuals for predicting constellations or personality features by electronically-scanning fingerprint types and inputting blood types of users, for example.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A method for predicting constellations, comprising:
providing a plurality of probability data of correlations between constellations and combined fingerprint types and blood types;
providing a plurality of constellation fortune-telling data or personality feature data;
detecting at least one fingerprint image and classifying the fingerprint types thereof;
inputting a personal blood type;
calculating probabilities of correlations between the constellations and the combined fingerprint types and blood types; and
correspondingly outputting at least one of the constellation fortune-telling data or at least one of the personality feature data according to the calculated probability.

2. The method as defined in claim 1, wherein the fingerprint image is selected from an image of a left thumb fingerprint or a right thumb fingerprint.

3. The method as defined in claim 1, wherein the fingerprint types include a right loop, a left loop, a tented arch, a plain arch, a whorl, an eddy and a twin loop.

4. The method as defined in claim 1, wherein the plurality of probability data is selected from the correlations between the constellations and the combined left and right thumb fingerprint types and blood types.

5. The method as defined in claim 1, further comprising using a classification method for fingerprint types including:
preprocessing the fingerprint image;
retrieving singular points of cores and deltas from the preprocessed fingerprint image;
calculating symmetry, circles and quadrants of the preprocessed fingerprint image to obtain orientation flows thereof; and
classifying the fingerprint image according to the singular points and the orientation flows to identify the fingerprint types of a right loop, a left loop, a tented arch, an arch, a whorl, an eddy and a twin loop.

6. A constellation-predicting system, comprising:
a fingerprint-image-detecting device used to detect at least one fingerprint image;
a blood-type-inputting unit used to input a personal blood type to the system; and
a calculating unit used to identify singular points and to trace orientation flows of the fingerprint image, and to calculate at least one probability of correlations between constellations and combined fingerprint types and blood types.

7. The constellation-predicting system as defined in claim 6, further including a memory unit to store constellation fortune-telling data, personality feature data and probability data of the correlations between the constellations and the combined fingerprint types and blood types.

8. The constellation-predicting system as defined in claim 6, further comprising a terminal unit to correspondingly output at least one of constellation fortune-telling data or at least one of the personality feature data according to the calculated probability.

9. The constellation-predicting system as defined in claim 8, wherein the terminal unit is selected from a display or a printer.

* * * * *